United States Patent [19]
Chawla et al.

[11] Patent Number: 5,878,328
[45] Date of Patent: Mar. 2, 1999

[54] METHOD AND APPARATUS FOR WIRELESS COMMUNICATION SYSTEM ORGANIZATION

[75] Inventors: Kapil K. Chawla, Middletown, N.J.;
Michael Jeffrey Dunn, Issaquh, Wash.;
Masud Kibria, Kirkland, Wash.;
Michael Allen Raffel, Redmond, Wash.;
Reinaldo A. Valenzuela, Holmdel, N.J.

[73] Assignee: AT&T Wireless Services, Inc., Middletown, N.J.

[21] Appl. No.: 575,974

[22] Filed: Dec. 21, 1995

[51] Int. Cl.⁶ ................................................... H04B 17/00
[52] U.S. Cl. .................. 455/67.1; 455/456; 455/450; 379/29
[58] Field of Search ................... 455/69.1, 67.1, 455/33.1, 67.4, 63.2, 408, 423, 456, 436, 446, 447, 450; 379/27, 29, 34, 1

[56] References Cited

U.S. PATENT DOCUMENTS

| | | | |
|---|---|---|---|
| 4,736,453 | 4/1988 | Schloemer | 455/33 |
| 4,918,437 | 4/1990 | Jasinski et al. | 340/825.44 |
| 4,965,850 | 10/1990 | Schloemer | 455/33 |
| 5,023,900 | 6/1991 | Tayloe et al. | 379/32 |
| 5,040,238 | 8/1991 | Comroe et al. | 455/33 |
| 5,093,924 | 3/1992 | Toshiyuki et al. | 455/33 |
| 5,095,500 | 3/1992 | Tayloe et al. | 379/32 |
| 5,109,529 | 4/1992 | Akaiwa | 455/34.1 |
| 5,134,709 | 7/1992 | Bi et al. | 455/33.1 |
| 5,148,548 | 9/1992 | Meche et al. | 455/34.1 |
| 5,157,709 | 10/1992 | Ohteru | 379/58 |
| 5,179,722 | 1/1993 | Gunmar et al. | 455/33.1 |
| 5,203,008 | 4/1993 | Yasuda et al. | 455/33.1 |
| 5,212,831 | 5/1993 | Chuang et al. | 455/54.1 |
| 5,241,685 | 8/1993 | Bodin et al. | 455/33.2 |
| 5,241,690 | 8/1993 | Larsson et al. | 455/54.1 |
| 5,265,119 | 11/1993 | Gilhousen et al. | 375/1 |
| 5,276,730 | 1/1994 | Cimini, Jr. et al. | 379/60 |
| 5,287,544 | 2/1994 | Menich et al. | 455/33.1 |
| 5,293,640 | 3/1994 | Gunmar et al. | 455/33.1 |
| 5,355,522 | 10/1994 | Demange | 455/62 |
| 5,361,399 | 11/1994 | Linquist et al. | 455/56.1 |
| 5,375,123 | 12/1994 | Andersson et al. | 370/95.1 |
| 5,430,775 | 7/1995 | Fulghum et al. | 375/202 |
| 5,442,804 | 8/1995 | Gunmar et al. | 455/33.1 |
| 5,442,806 | 8/1995 | Barber et al. | 455/33.1 |
| 5,465,390 | 11/1995 | Cohen | 455/33.4 |
| 5,475,868 | 12/1995 | Duque-Anton et al. | 455/62 |
| 5,475,870 | 12/1995 | Weaver, Jr. et al. | 455/67.1 |
| 5,594,946 | 1/1997 | Menich et al. | 455/54.1 |
| 5,613,217 | 3/1997 | Hagstrom et al. | 455/67.1 |

FOREIGN PATENT DOCUMENTS

| | | |
|---|---|---|
| 0 696 151 A2 | 7/1995 | European Pat. Off. . |
| 0752 766 A1 | 1/1997 | European Pat. Off. . |
| 9019759.1 | 9/1990 | United Kingdom . |
| 9216044.9 | 7/1992 | United Kingdom . |
| WO 90/10341 | 2/1990 | WIPO . |
| WO 95/26598 | 3/1995 | WIPO . |
| WO 96/09696 | 9/1995 | WIPO . |

*Primary Examiner*—Reinhard J. Eisenzopf
*Assistant Examiner*—Darnell R. Armstrong

[57] ABSTRACT

A level of system self-organization in a wireless communication system is provided using a combined design, planning and verification process to determine system organization parameters. The process determines the parameters based on a measured path loss-related characteristic, such as path loss or bit error rate, between base stations and a plurality of regions in a coverage area. For each region, the characteristic is measured to each base station irrespective of the proximity between the region and the base stations. The measured characteristics enable the prediction of signal strength received at the regions of signals transmitted by the base stations independent of the region location. Accordingly, the characteristics can be measured without information correlating the absolute geographic locations of the regions. The resulting unique characterization of the path loss-related information can be used to determine a variety of system organization parameters, such as the number and transmission power of base stations, neighbor lists, sets of base stations that can reuse channels and the identity of base stations, if any, that can be omitted from the system.

40 Claims, 4 Drawing Sheets

METHOD AND APPARATUS FOR WIRELESS COMMUNICATION SYSTEM ORGANIZATION

FIELD OF THE INVENTION

The invention relates to wireless communication systems in general and more particularly to the organization of such systems.

BACKGROUND OF THE INVENTION

Conventional radio telephone systems such as cellular systems use cell-sites having co-located transmitters and receivers to cover small geographical regions referred to as cells. Several cell-sites disposed within a particular geographic area are coupled to a master controller called a mobile telephone switching office (MTSO). The MTSO controls the cell-sites and provides an interface connection to the public switched telephone network (PSTN).

Each conventional cell-site uses pre-assigned channel sets to communicate with mobile units in a service area covered by the cell-site. Each channel set typically includes a pair of carrier frequencies with each carrier frequency being used for respective up-link or down-link communications with a mobile unit. Neighboring cell-sites use different channel sets to avoid interference on the same channel between adjacent service areas.

Conventional cellular systems provide mobility to a subscriber through a procedure referred to as hand-off. According to this procedure, cell-sites which are geographically adjacent are considered to be neighbor cell-sites. A neighbor cell-site is the cell-site to which a call can be transferred to as a mobile unit traverses a current cellsite boundary. The transferring of a call from one cell-site to another is referred to as a hand-off. The parameters which specify the cell-sites that can receive a hand-off from a particular cell-site are included in a table called a neighbor list for that particular cell-site.

The channel sets and neighbor lists assigned to particular cell-sites as well as other system organization parameters, such as the number and transmission power of cell-sites, are typically determined using propagation models prior to installation of a system. After installation with the parameter settings determined by the modeling process, the system coverage area is verified by field testing. During a typical field test, a mobile test unit is moved throughout the service area while the base stations transmit respective test frequencies. As the test unit is moved from one sampling location to the next, the signal strength of the test frequencies and the corresponding geographic location is collected and processed to verify that the system can provide service to the intended coverage area. In some conventional systems, uplink signal strength is also measured from the sampling locations to verify the service area coverage.

If a change in a parameter setting is indicated, then the modeling, implementation and subsequent field testing are performed with the new parameter setting. As a result, conventional installations require a labor intensive, time consuming and costly iterative process of modeling, implementation and verification. Typically, conventional systems do not automatically determine organization parameters. Such automatic determination of parameters is known as "self-organization" in the art.

Other radio telephone systems such as personal communication networks (PCN) and/or indoor cellular systems similarly use localized base stations having smaller service areas than cell-sites. However, the installation of such systems is substantially similar to that previously described for the cellular system and typically requires the labor intensive, time consuming and costly iterative process of modeling, implementation and verification.

To increase the simultaneous communication capacity of a system, channel reuse is employed where two sufficiently distant base stations simultaneously use the same channel. In such systems, estimates of co-channel interference are often used during the modeling stage to insure acceptable quality of the communication link. However, these estimates are typically conservative which limits the communication capacity.

More recently, a limited form of self-organization called dynamic channel allocation has provided greater spectral efficiency and capacity. This technique typically detects interference levels on a set of channels immediately prior to establishing communication with a mobile unit and then establishes such communication using channels in the set with the lowest interference level.

Nevertheless, a need exists for a radio telephone system having enhanced spectral efficiency that uses substantially automated planning, organization and verification during installation that does not require extensive modeling or testing.

SUMMARY OF THE INVENTION

The invention provides a level of system self-organization in a wireless communication system using a novel and unobvious combined design, planning and verification process to determine system organization parameters. The process determines parameters based on path loss-related characteristics measured between regions in the coverage area and the system's base stations. Path loss-related characteristic refers to measurable characteristics that are partially or fully based on path loss and include, for example, path loss, bit error rate, word error rate and frame error rate. Path loss refers to the reduction in power of a signal transmitted between two points. A path loss-related characteristic between a region and a base station is, for example, the mean, median or other similar measure of the path loss-related characteristic from the base station to a point or set of localized points that make up the region. Coverage area refers to the geographic area in which a mobile unit can communicate with the base stations without substantial interruption.

For each region, path loss-related characteristics, such as path loss, are measured from the region to each base station irrespective of the proximity between the region and the base stations. The measured path loss-related characteristics enable the prediction of received signal strength of transmitted signals between the regions and the base stations. As a consequence, the individual and cumulative effects of signals transmitted by the respective base stations at the regions can be obtained from the measured characteristics without regard to the regions' locations. Accordingly, the path loss-related characteristics can be measured without correlation to information regarding absolute geographic locations of the regions. Absolute geographic locations of the regions refers to the location of the regions relative to the coverage area, the system's base stations, or to locations outside of the coverage area.

It should be readily understood that the path loss from a base station to a region is substantially identical to the reverse path loss from the region and the base station. Thus, the measured path loss-related characteristics also represent the individual and cumulative effects of signals transmitted from the respective regions to the base stations. The resulting unique representation or characterization of the path loss-related information can be used to determine a variety of important system parameter settings including, for example, the number and transmission power of base stations, neighbor lists, identity of base stations, if any, that can be omitted from the system, and the sets of base stations which can reuse channels.

In an exemplary embodiment, path losses are measured using a mobile test unit broadcasting a test signal at a known transmission power. The test unit is moved from region to region in the service area and the base stations detect the received signal strength from a variety of locations throughout the regions. The path losses between the test unit and the base stations are computed from the differences in power of the transmitted and received signal. A path loss matrix characterization is then generated including values based on the measured path losses. A system organization parameter, such as base station power levels, can then conveniently be determined based on the matrix. The determined parameter can be used to establish communications between a mobile unit and the base station.

Since path loss-related measurements are taken using installed base stations and not propagation models, determination of a parameter and verification of the corresponding system performance can be performed in a single process. Further, the measurements taken using a test unit can advantageously be made without tracking the absolute geographic locations. Thus, the invention avoids the complex and labor intensive recording of geographic location that is typically required during the verification step of conventional installation techniques. Moreover, no additional field measurements are required for reconfiguring the system unless such reconfiguration results in a change of the path losses, such as, for example, the relocation of base station antennas.

Additional features and advantages of the present invention will become more readily apparent from the following detailed description and accompanying drawings.

DETAILED DESCRIPTION

The invention concerns methods for determining at least one system organization parameter in a wireless communication system and a method of wireless communication based on such determined parameter. As used herein, a system organization parameter refers to a system characteristic determined or verified during the installation and/or operation of the communication system including mobile unit access parameters. The methods determine the parameter based on a measured path loss-related characteristic between at least one region in the coverage area and the system's base stations.

Path loss-related characteristics are measurable characteristics that are partially or fully based on path loss. In addition to path loss, such characteristics also include, for example, bit error rate, word error rate and frame error rate. Path loss concerns the reduction in power of a signal transmitted between two points. A path loss-related characteristic between a region and a base station is, for example, the mean, median or other similar measure of the path loss-related characteristic from the base station to a point or the set of localized points that make up the region. Coverage area refers to the geographic area in which a mobile unit can communicate with the base stations without substantial interruption.

The measured path loss-related characteristics enable the representation of the signal propagation or reduction in signal strength between the regions and the base stations without regard to the regions' geographic location relative to the base stations or locations outside of the coverage area, or its position within the coverage area. As a consequence, the corresponding measurements can advantageously be made without tracking the regions' absolute geographic locations. Absolute geographic locations of the regions refers to the location of the regions relative to the system's base stations or the coverage area, or to locations outside of the coverage area.

The resulting characterization of the path loss-related information can be used to determine a variety of system parameters. Upon determining a parameter in accordance with the invention, such a parameter can be used by the system in establishing communications with mobile units in the coverage area. However, it should be readily understood that the parameter determination need not be made prior to the establishment of each communication, but can be made at the time of the system installation or intermittently during the operation of the system.

Figure 1:
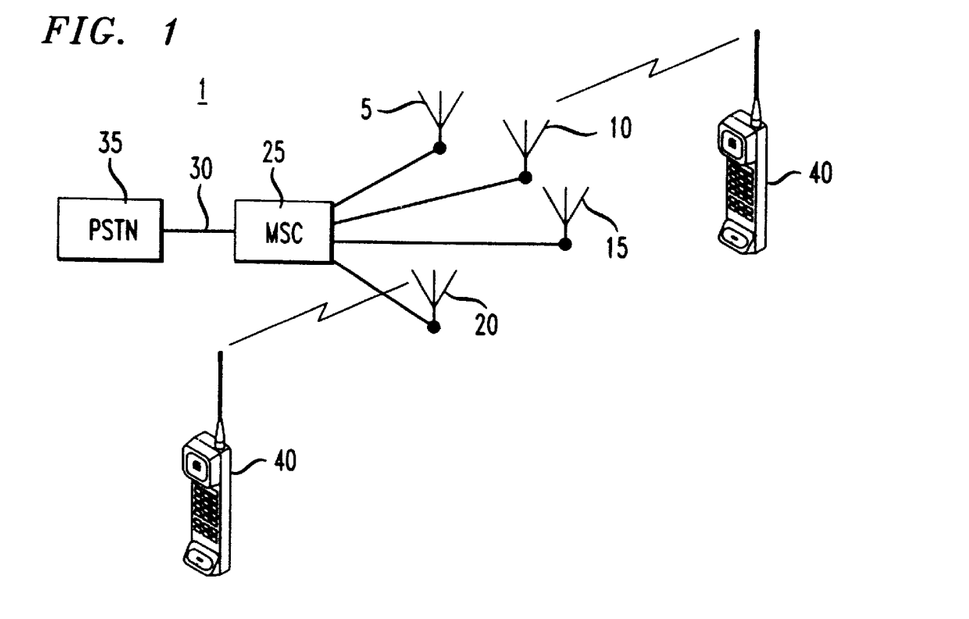
FIG. 1 illustrates a schematic block diagram of an exemplary wireless communication system having at least one system organization parameter determined in accordance with the invention.

An exemplary wireless communication system 1 having at least one system organization parameter determined in accordance with the present invention is shown in FIG. 1. The system includes four base stations 5, 10, 15 and 20 (5–20) connected to a wireless switching center (MSC) 25. The MSC 25 is connected to a public switched telephone network (PSTN) 35 by a suitable trunk 30. If the system 1 is an indoor or outdoor system with a relative small coverage area, such as one or more floors of an office building or a campus, then the MSC 25 can alternatively be connected to the PSTN via a private branch exchange (PBX).

The MSC 25 is responsible for routing calls between the mobile units 40 and the respective base stations 5–20 and to the PSTN 35. For small coverage area applications, suitable MSC's and base stations include, for example, small MSC devices manufactured by Celcore and microcells manufactured by AT&T Corp., respectively. For larger coverage area applications, exemplary MSC and base stations include those manufactured by wireless infrastructure manufacturers such as AT&T Corp. The method of wireless communication is not critical to practicing the invention and can be, for example, digital communications techniques including code division multiple access (CDMA) schemes or time division multiple access (TDMA) schemes such as a TDMA scheme in accordance with the IS-136 standard as well as conventional analog techniques.

Figure 2:
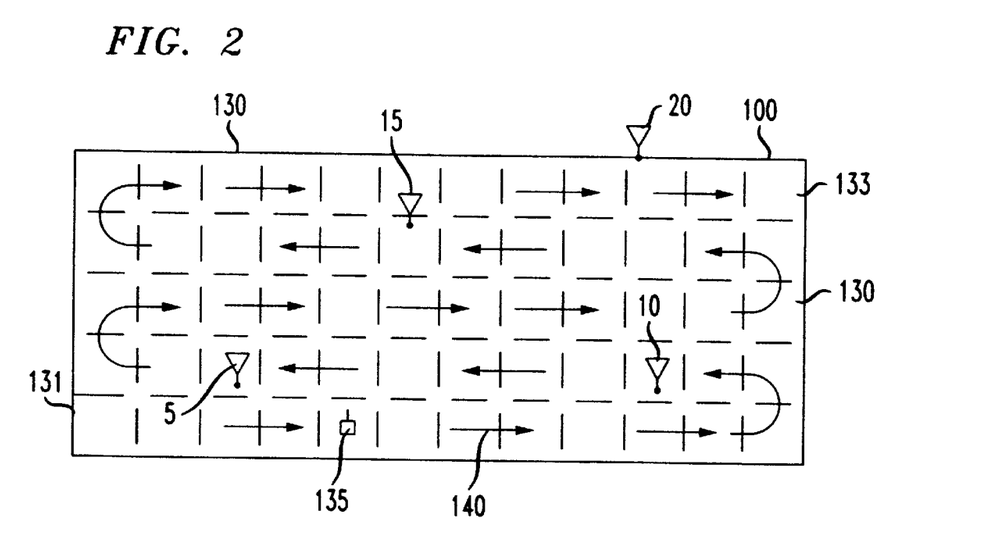
FIG. 2 illustrates a schematic block diagram of base stations in FIG. 1 arranged to provide service to a coverage area.

FIG. 2 shows the base stations 5–20 of FIG. 1 arranged to provide service to an intended rectangular coverage area 100. It is possible for such a system coverage area to be, for example, 100 m by 200 m to provide wireless communication, such as cellular communication service, to a floor of an office building. The size and shape of the coverage area and the number of positioned base stations is not critical to practicing the invention. Although the depicted coverage area 100 could represent an office building floor, it should be readily understood that the technique of the invention is useful in a variety of wireless systems including, for example, other indoor systems such as those providing service to multiple floors of an office building, airport facilities or shopping malls, and in outdoor systems providing service to a campus or larger systems such as conventional cellular telephone systems as well as PCS systems.

In order to determine a system organization parameter in accordance with the invention, path loss-related characteristics are measured between each of the base stations 5–20 and a plurality of regions 130 within the coverage area 100. Although path loss is used as the measured characteristic in the following described embodiments, it should be readily understood that other path loss-related characteristics, such as bit error rate, can also be used in accordance with the invention. Also, by measuring the path loss-related characteristic to a base station, it is meant to measure the path loss-related characteristic to at least one antenna associated with the base station. For ease of illustration and discussion, the antennas associated with the base stations 5–20 are depicted in close proximity to the base stations 5–20. However, it should be readily understood that the base station antennas need not be positioned in such a manner and can also be a distance from the base stations, such as when distributed antennas are employed.

The regions 130 are shown to be similarly sized and organized into an array within the coverage area 100 for ease of illustration and discussion purposes only and is not meant to be a limitation of the invention. The regions 130 need not be similarly sized nor organized into an array. The number and size of the regions 130 should be chosen to enable the establishment of a sufficient path loss representation to determine a desired system organization parameter.

The number and size of the regions 130 can be partially based on the size of the base station service areas. For instance, in a large outdoor system, such as a conventional cellular telephone system, a region 130 can be as large as ten's of square meters, while in an indoor system, such as a floor of an office building, a region 130 can be as small as approximately a quarter of a square meter. It is possible to use a number of regions 130 to be serviced by a respective base station that is on the order or approximately 100 to 900 regions or greater. A region 130 can also be viewed as the localized area within the vicinity of a point wherein the recognized path loss from the point to a base station is the path loss measure for the contiguous points that make up the region 130.

In accordance with an embodiment of the invention, path losses at the regions 130 are conveniently measured using a mobile test unit 135 in the following manner. The mobile test unit 135 broadcasts a signal having a known power $S_1$ over a selected channel as the unit 135 is moved from one region 130 to the next. The base stations 5–20 measure the power of the received signal $S_2$ as the mobile test unit 135 is in a region 130. It is possible to move the mobile test unit 135 from a first region 131 along a serpentine path 140 through the other regions 130 to a last region 133. For indoor systems, the test unit transmission power can be, for example, on the order of 20 dBm, and for outdoor systems, the test unit transmission power can be, for example, on the order of 34 dBm.

It is possible for the installer to alert the base stations 5–20 to take a reading as the test unit 135 is moved from region to region. In the alternative, the base stations 5–20 can take readings, synchronously, such as substantially simultaneously or otherwise, at particular time intervals as the test unit 135 is moved from region to region. In such an instance, the time interval should be set to enable the installer to have time to move the test unit 135 from one region 130 to the next. For instance, if path losses are to be measured at points approximately 0.5 to 1 m apart and the average walking speed of the installer is 2 m/s then the base measurement time interval should be in the range of 0.25–0.5 seconds to obtain the necessary readings. This technique also enables the system to detect and adjust anomalous measurements between several substantially consecutive readings with one reading having an uncharacteristically different path loss. Further, the installer can be permitted to signal the base stations to start and stop taking measurement readings to enable for breaks as well as to signal the conclusion of the test.

A path loss L can be determined from the signal power received by each base station 5–20 according to equation (A): $L = S_1 - S_2 + G_{base} + G_{mobile}$, wherein $G_{base}$ and $G_{mobile}$ are the base station and mobile test unit antenna gains, respectively. Antenna gains $G_{base}$ of convention mobile units are typically in the range of approximately 0 to 3 dB for omni-directional antennas, and antenna gains for conventional cellular telephone base stations $G_{base}$ are often on the order of 10 dB. Base station antenna gain $G_{base}$ for smaller wireless communication systems such as indoor systems can, for example, be in the range of approximately 0 to 3 dB.

The path loss L can be determined in substantially real time upon detection of the received signal power $S_2$ by the base stations 5–20. Such a determination can be made by the base stations or a controller associated with the MSC 25, shown in FIG. 1. In accordance with the invention, no geographic information need be taken to correlate the measured path losses with the location of the regions 130 relative to the base stations 5–20, the coverage area 100 or otherwise. Provided in the following Table 1 is a list of path losses based on exemplary signal strength readings between the respective regions 130 and each of the base stations 5–20. A region number has been given for ease of discussion but no such reference is required in accordance with the invention.

TABLE 1

| | Base stations | | | |
|---|---|---|---|---|
| Region | 5 (dB) | 10 (dB) | 15 (dB) | 20 (dB) |
| 1 | 70 | 124 | 115 | 129 |
| 2 | 42 | 119 | 110 | 126 |
| 3 | 42 | 113 | 105 | 122 |
| 4 | 70 | 107 | 101 | 118 |
| 5 | 87 | 98 | 98 | 115 |
| 6 | 98 | 87 | 93 | 111 |
| 7 | 107 | 70 | 101 | 108 |
| 8 | 113 | 42 | 105 | 107 |

TABLE 1-continued

| | Base stations | | | |
|---|---|---|---|---|
| Region | 5 (dB) | 10 (dB) | 15 (dB) | 20 (dB) |
| 9 | 119 | 42 | 110 | 107 |
| 10 | 124 | 70 | 115 | 108 |
| 11 | 124 | 70 | 111 | 101 |
| 12 | 119 | 42 | 105 | 98 |
| 13 | 113 | 42 | 98 | 98 |
| 14 | 107 | 70 | 91 | 101 |
| 15 | 93 | 87 | 87 | 105 |
| 16 | 87 | 98 | 87 | 110 |
| 17 | 70 | 107 | 91 | 115 |
| 18 | 42 | 113 | 98 | 119 |
| 19 | 42 | 119 | 105 | 124 |
| 20 | 70 | 124 | 111 | 128 |
| 21 | 80 | 125 | 108 | 126 |
| 22 | 70 | 120 | 101 | 122 |
| 23 | 70 | 115 | 91 | 117 |
| 24 | 80 | 108 | 80 | 111 |
| 25 | 91 | 101 | 70 | 105 |
| 26 | 101 | 91 | 70 | 98 |
| 27 | 108 | 80 | 80 | 91 |
| 28 | 115 | 70 | 91 | 87 |
| 29 | 120 | 70 | 101 | 87 |
| 30 | 125 | 80 | 108 | 91 |
| 31 | 126 | 91 | 107 | 80 |
| 32 | 122 | 87 | 98 | 70 |
| 33 | 117 | 87 | 87 | 70 |
| 34 | 111 | 91 | 70 | 80 |
| 35 | 105 | 98 | 42 | 91 |
| 36 | 98 | 105 | 42 | 101 |
| 37 | 91 | 111 | 70 | 108 |
| 38 | 87 | 117 | 87 | 115 |
| 39 | 87 | 122 | 98 | 120 |
| 40 | 91 | 126 | 107 | 125 |
| 41 | 101 | 128 | 107 | 124 |
| 42 | 98 | 124 | 98 | 119 |
| 43 | 98 | 119 | 87 | 113 |
| 44 | 101 | 115 | 70 | 107 |
| 45 | 105 | 110 | 42 | 98 |
| 46 | 110 | 105 | 42 | 97 |
| 47 | 115 | 101 | 70 | 70 |
| 48 | 119 | 98 | 87 | 42 |
| 49 | 124 | 98 | 98 | 42 |
| 50 | 128 | 101 | 107 | 70 |

During actual path loss testing, the detected signal strength $S_2$ would be limited to the detection range of the receiver. Accordingly, high power readings would be clipped to the upper limit of the receiver measurement range and, likewise, some of the lower power levels would be determined at the "noise floor" of the receiver. The path loss values contained in Table 1 can be arranged into a path loss matrix characterization for ease of use in determining system organization parameter.

The previously described method for determining path loss employs a test signal from a test unit 135 to the base stations. However, other techniques can be employed to measure the path losses. For example, techniques can be used where the base stations 5–20 transmit the test signal which are read by the mobile test unit 135. In such instances, the base stations 5–20 can continuously transmit test signal of individual respective channels or sequentially transmit on the same channel as the mobile test unit 135 is in each region 130. Further, in such instances, the mobile test unit 135 can perform the path loss calculations in real rime or the collected signal strength data can be down loaded to a computer for subsequent processing.

The path loss characterization facilitates determination of a large variety of system organization parameters including the number and transmission power of base stations, base station service areas, isolation values, neighbor lists, sets of base stations that can reuse channels, and the determination of whether a base station can be removed from the system while still maintaining the coverage area. A description of the determined of the previously listed parameters follows. However, these parameter determinations are representative of the parameters that can be determined in accordance with the invention and not exhaustive and are not intended to be a limitation of the invention.

I. Base Station Power Level Settings

It is possible to determine the base station power level settings such that, for example, 95% of the regions in the coverage area 100 would receive a threshold signal strength of a least −85 dBm. Such a constraint is for explanation purposes only and it is possible to employ other constraints for determining the required coverage area according to a particular invention. For instance, additional coverage constraints can include, for example, setting a particular limit on the number of contiguous regions that would receive signal power below the desired threshold. For ease of discussion, the base stations 5–20 are limited to transmitting signals having power levels in the range of 0 dBm to 20 dBm in steps off 5 dBm.

The received signal strength that would occur at a region 130 from one of the base stations 5–20 can conveniently be determined based on equation (B): $S_2 = S_1 - L + G_{base} + G_{mobile}$, wherein the path loss L is taken from the Table 1 and the antenna gains $G_{base}$ and $G_{mobile}$ are known values, such as 0 dB for each antenna, respectively. Thus, in this example, the received signal strength $S_2$ can be determined for the base station transmission power settings $S_1$ from the equation: $S_2 = S_1 - L$.

In verifying the system organization parameters of the number of base stations, one exemplary technique determines the signal coverage at the regions 130, shown in FIG. 2, using the equation (B) with the transmission power $S_1$ set to maximum, i.e. 20 dBm in the example. If the determined signal coverage is at least −85 dBm for 95% of the regions then desired coverage area can be provided with the base stations set at their maximum power. Assuming each base station 5–20 uses a transmission power of 20 dBm then using the equation (B), can be determined that 100% of the regions 130 would receive a signal strength from at least one of the base stations 5–20 that met the threshold of −85 dBm. The following Table 2 provides a listing of the signal strengths that would be received at each region.

TABLE 2

| Signal strength received from base stations 5, 10, 15 and 20 | | | | | |
|---|---|---|---|---|---|
| Region | 5 (dBm) | 10 (dBm) | 15 (dBm) | 20 (dBm) | highest power level setting (dBm) |
| 1 | −50 | −104 | −95 | −109 | −50 |
| 2 | −22 | −99 | −90 | −106 | −22 |
| 3 | −22 | −93 | −95 | −102 | −22 |
| 4 | −50 | −87 | −81 | −98 | −50 |
| 5 | −67 | −78 | −78 | −95 | −67 |
| 6 | −78 | −67 | −78 | −91 | −67 |
| 7 | −87 | −50 | −81 | −88 | −50 |
| 8 | −93 | −22 | −85 | −87 | −22 |
| 9 | −99 | −22 | −90 | −87 | −22 |
| 10 | −104 | −50 | −95 | −88 | −50 |
| 11 | −104 | −50 | −91 | −81 | −50 |
| 12 | −99 | −22 | −85 | −78 | −22 |
| 13 | −93 | −22 | −78 | −78 | −22 |

TABLE 2-continued

Signal strength received from base stations 5, 10, 15 and 20

| Region | 5 (dBm) | 10 (dBm) | 15 (dBm) | 20 (dBm) | highest power level setting (dBm) |
|---|---|---|---|---|---|
| 14 | −87 | −50 | −71 | −81 | −50 |
| 15 | −78 | −67 | −67 | −85 | −67 |
| 16 | −67 | −78 | −67 | −90 | −67 |
| 17 | −50 | −87 | −71 | −95 | −50 |
| 18 | −22 | −93 | −78 | −99 | −22 |
| 19 | −22 | −99 | −85 | −104 | −22 |
| 20 | −50 | −104 | −91 | −108 | −50 |
| 21 | −60 | −105 | −88 | −106 | −60 |
| 22 | −50 | −100 | −81 | −102 | −50 |
| 23 | −50 | −95 | −71 | −97 | −50 |
| 24 | −60 | −88 | −60 | −91 | −60 |
| 25 | −71 | −81 | −50 | −85 | −50 |
| 26 | −81 | −71 | −50 | −78 | −50 |
| 27 | −88 | −60 | −60 | −71 | −60 |
| 28 | −95 | −50 | −71 | −67 | −50 |
| 29 | −100 | −50 | −81 | −67 | −50 |
| 30 | −105 | −60 | −88 | −71 | −60 |
| 31 | −106 | −71 | −87 | −60 | −60 |
| 32 | −102 | −67 | −78 | −50 | −50 |
| 33 | −97 | −67 | −67 | −50 | −50 |
| 34 | −91 | −71 | −50 | −60 | −50 |
| 35 | −85 | −78 | −22 | −71 | −22 |
| 36 | −78 | −85 | −22 | −81 | −22 |
| 37 | −71 | −91 | −50 | −88 | −50 |
| 38 | −67 | −97 | −67 | −95 | −67 |
| 39 | −67 | −102 | −78 | −100 | −67 |
| 40 | −71 | −106 | −87 | −105 | −71 |
| 41 | −81 | −108 | −87 | −104 | −81 |
| 42 | −78 | −104 | −78 | −99 | −78 |
| 43 | −78 | −99 | −67 | −93 | −67 |
| 44 | −81 | −95 | −50 | −87 | −50 |
| 45 | −85 | −90 | −22 | −78 | −22 |
| 46 | −90 | −85 | −22 | −67 | −22 |
| 47 | −95 | −81 | −50 | −50 | −50 |
| 48 | −99 | −78 | −67 | −22 | −22 |
| 49 | −104 | −78 | −78 | −22 | −22 |
| 50 | −108 | −81 | −87 | −50 | −50 |

In the alternative, if the determined signal coverage does not meet the threshold of −85 dBm for 95% of the regions 130 then additional base stations are required or the existing base stations need be repositioned to provide the required coverage area.

Figure 3:
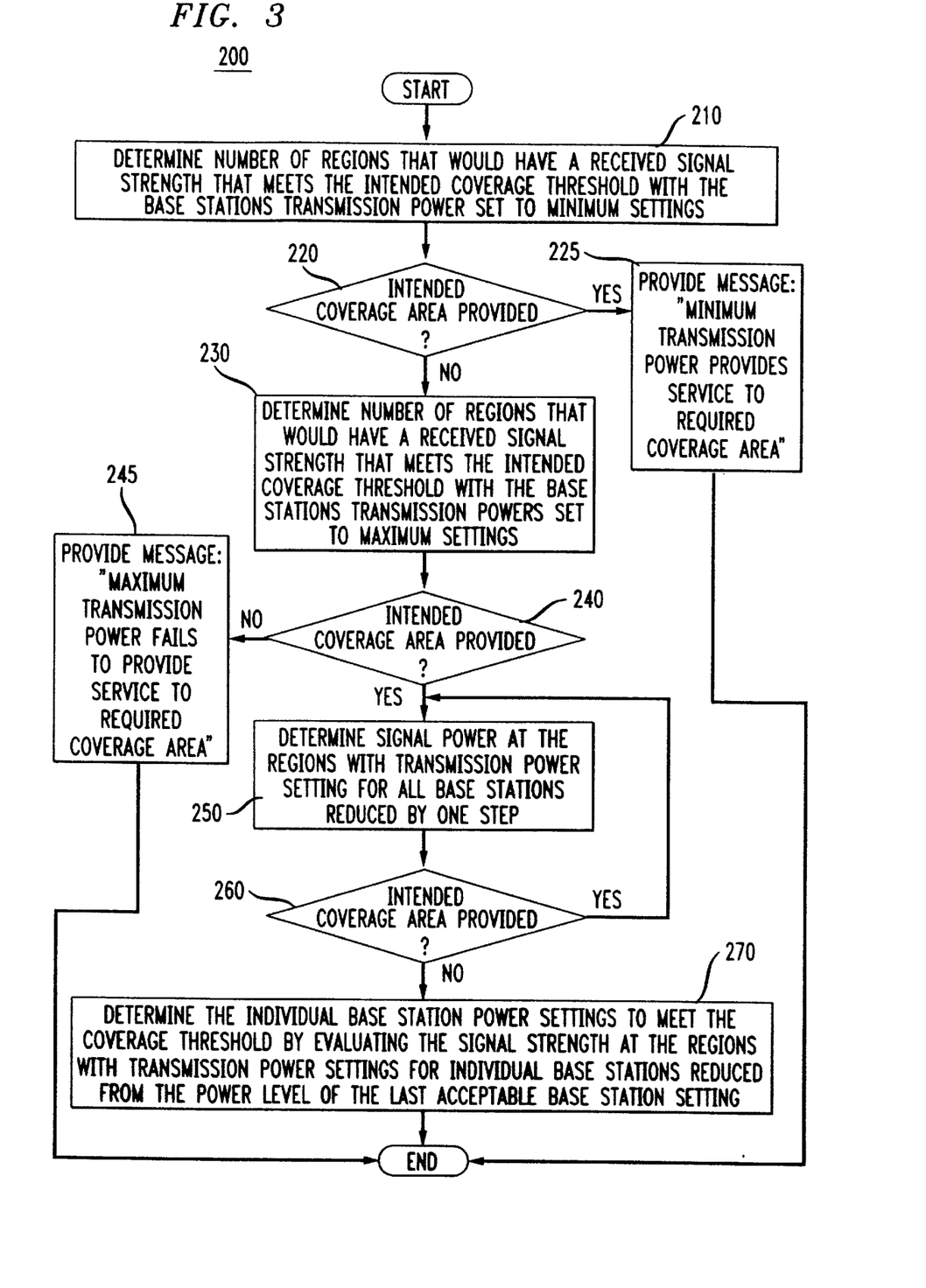
FIG. 3 illustrates a flow diagram of exemplary process in accordance with the invention for determining base station transmission power settings for the system arrangement of FIG. 2.

Although 100% coverage is obtained with maximum base station transmission power settings, it is desirable to determine the substantial minimum base station power settings that would achieve the desired coverage area in order to facilitate channel reuse with a substantial minimum of channel interference within and outside of the system being installed. An exemplary method 200 in accordance with the invention for determining the substantial minimum base station transmission power settings is shown in FIG. 3. The method 200 is for illustration purposes only and is not meant to be a limitation of the invention. The particular technique is not critical to the invention and numerous other methods can be used to provide such a determination.

Referring to FIG. 3, the number of regions that would receive a signal strength $S_2$ that meets the threshold of −85 dBm from a minimum base station transmission power $S_1$ is identified in step 210. Such a determination can be made for the region 130 using the previously recited equation (B) for each region to compute the signal strength that would be received. In this example, the minimum base station power for the base stations is 0 dBm. Accordingly, for each region, received signal strength $S_2$ would be (B): $S_2=S_1-L+G_{base}+G_{mobile}$, $=0-L+0+0=-L$. Thus, the signal strength values at the regions would be equal in magnitude in dBm to the path loss L in dBm that is contained in Table 1.

Then, in step 220, a determination of whether the computed received signal strengths $S_2$ in step 210 meets the coverage area requirement of 95%. Such a determination can conveniently be made by determining the percentage of the regions receiving at least one signal strength meeting the threshold of −85 dBm. If the required coverage percentage is met by the minimum transmission power setting then a corresponding message is provided to the installer to alert him of this condition in step 225 and the routine 220 ends. In such an instance, it may be desirable to further determine if one or more of the base stations 5–20 can be removed while still meeting the coverage area requirement as is described in greater detail below in section III.

However, if the coverage area requirement is not met, in step 220, then the routine 200 proceeds to step 230. In this example, the required coverage area is not met by the minimum base station transmission power settings because only 40 of the 50 regions or 80% would receive a signal strength that meets the threshold. As is indicated in Table 1, ten of the 50 regions, regions 5, 6, 15, 16 and 38–43 would fail to receive at least one signal strength $S_2$ of −85 dBm with the base stations 5–20 transmitting at a power of 0 dBm. Accordingly, in this example, the process 200 would proceed to step 230 because the minimum transmission power setting would produce a coverage area of 80% and not the required 95%.

In step 230, the number of regions that would receive a signal strength meeting the threshold requirement is identified for the base stations 5–20 set at a maximum transmission power. This can be identified in the identical manner described above with regard to Table 2. Then, a determination is made as to whether the number of regions identified meets the coverage requirement in step 240. This determination can conveniently be made in a substantially identical manner to that previously described with regard to step 220. If the required coverage area is not met by the maximum transmission power setting then a message is provided to the installer in step 245 stating this condition and the routine 200 ends. In such a case, additional base stations would be required or the existing base stations need be repositioned to provide the required coverage area.

However, if in step 240, it is determined that the coverage area requirement is met by the maximum transmission power settings then the routine 200 proceeds to step 250. In this example, the intended coverage area would be met using the maximum base station transmission power settings of 20 dBm. As is shown in Table 2 the transmission power settings at 20 dBm, provides 100% of the regions 130 with signal strengths $S_2$ that meet the threshold requirement. Accordingly, in this example, the process 200 would proceed to step 250.

In steps 250, the regions 130 that would receive a signal strength meeting the threshold requirement is again determined with the base station transmission power settings uniformly reduced by one step. For this example, the base station transmission power settings are reduced uniformly from the maximum setting of 20 dBm by one step to 15 dBm. Then, in step 260, if the resulting coverage area would meet the coverage area requirement then the process 200 returns to step 250 and the coverage area is determined again for the base stations' transmission powers uniformly reduced by another step, such as to 10 dBm in this example.

However, if in step 260, the resulting coverage area would not meet the coverage area requirement then the precess 200 proceeds to step 270. In step 270, the transmission power settings of the base stations 5–20 are individually reduced from the last uniform setting that met the coverage area requirement in order to determine if still lower power settings can be used. In this manner, the substantially minimum power settings that provides the required coverage area can quickly and easily be determined by the process 200. For the example, the process 200 would determine that the substantially minimum transmission power settings would be 10, 5, 5, and 0 dBm for the base stations 5–20, respectively. The signal strengths received by the regions 130 with such base stations transmission power settings are shown in the following Table 3.

TABLE 3

Signal strength received from base stations 5, 10, 15 and 20

| Region | 5 (dBm) | 10 (dBm) | 15 (dBm) | 20 (dBm) |
|---|---|---|---|---|
| 1 | −60 | −119 | −110 | −129 |
| 2 | −32 | −114 | −105 | −126 |
| 3 | −32 | −108 | −100 | −122 |
| 4 | −60 | −102 | −96 | −118 |
| 5 | −77 | −93 | −93 | −115 |
| 6 | −88 | −82 | −93 | −111 |
| 7 | −97 | −65 | −96 | −108 |
| 8 | −103 | −37 | −100 | −107 |
| 9 | −109 | −37 | −105 | −107 |
| 10 | −114 | −65 | −110 | −108 |
| 11 | −114 | −65 | −106 | −101 |
| 12 | −109 | −37 | −100 | −98 |
| 13 | −103 | −37 | −93 | −98 |
| 14 | −97 | −65 | −86 | −101 |
| 15 | −88 | −82 | −82 | −105 |
| 16 | −77 | −93 | −82 | −110 |
| 17 | −60 | −102 | −86 | −115 |
| 18 | −32 | −108 | −93 | −119 |
| 19 | −32 | −114 | −100 | −124 |
| 20 | −60 | −119 | −106 | −128 |
| 21 | −70 | −120 | −103 | −126 |
| 22 | −60 | −115 | −96 | −122 |
| 23 | −60 | −110 | −86 | −117 |
| 24 | −70 | −103 | −75 | −111 |
| 25 | −81 | −96 | −65 | −105 |
| 26 | −91 | −86 | −65 | −98 |
| 27 | −98 | −75 | −75 | −91 |
| 28 | −105 | −65 | −86 | −87 |
| 29 | −110 | −65 | −96 | −87 |
| 30 | −115 | −75 | −103 | −91 |
| 31 | −116 | −86 | 102 | −80 |
| 32 | −112 | −82 | −93 | −70 |
| 33 | −107 | −82 | −82 | −70 |
| 34 | −101 | −86 | −65 | −80 |
| 35 | −95 | −93 | −37 | −91 |
| 36 | −88 | −100 | −37 | −101 |
| 37 | −81 | −106 | −65 | −108 |
| 38 | −77 | −112 | −82 | −115 |
| 39 | −77 | −117 | −93 | −120 |
| 40 | −81 | −121 | −102 | −125 |
| 41 | −91 | −123 | −102 | −124 |
| 42 | −88 | −119 | −93 | −119 |
| 43 | −88 | −114 | −82 | −113 |
| 44 | −91 | −110 | −65 | −107 |
| 45 | −95 | −105 | −37 | −98 |
| 46 | −100 | −100 | −37 | −87 |
| 47 | −105 | −96 | −65 | −70 |
| 48 | −109 | −93 | −82 | −42 |
| 49 | −114 | −93 | −93 | −42 |
| 50 | −118 | −96 | −102 | −70 |

As shown in Table 3, the base station transmission power settings of 10, 5, 5 and 0 dBm for the base stations 5–20, respectively, would provide regions 1–40 and 43–50 with signal strengths that meet or surpass the threshold of −85 dBm. Accordingly, the resulting 100 coverage area of 96% (48/50×100%) would meet the requirement of 95%.

In the process 200, it should readily be understood that in step 270 it is possible for the process to determine that the last acceptable uniform base station power settings determined in step 250 would yield the required coverage area and that further individual reduction could not produce such coverage. Accordingly, it is possible in step 270 to mission setting would provide the required coverage area.

II. Base Station Service Areas

The regions that are serviced by particular base stations can be identified based on the base station power level settings and the measured path losses. In order to provide overlaps of service areas a hand-off hysteresis limit, such as for example of 15 dBm can be used. Accordingly, communication between the system 1 in FIG. 2 and a mobile unit is provided by a first base station if that base station provides the substantially strongest received signal at the mobile unit from the base stations and if this received signal meets or exceeds the threshold of −85 dBm. This same mobile unit location can also be covered by a second base station if the signal strength received at the location is at least −85 dBm as well as within the hand-off hysteresis of 15 dBm of the signal strength received from the first base station.

Table 4 is based on the signal strengths listed in Table 3 and includes the base stations that cover the respective regions assuming a hysteresis hand-off limit of 15 dBm. In Table 4, a "1" denotes that the corresponding region is covered by a particular base station and a "0" denotes that no coverage is provided to the region by the particular base station. For instance, at region 24 in Table 3, the received signal strengths from base stations 10 and 20 are −103 and −111 dBm, respectively, which are below −85 dBm and therefore, these base stations would not cover the region 24 as indicated by the "0's" in Table 4. However, the received signal strengths from base stations 5 and 15 are −70 and −75 dBm, respectively which are both above the threshold −85 dBm and within 15 dBm of one another. Thus, base stations 5 and 15 would cover the region 24 as indicated by the "1's" in Table 4.

Conversely, Table 3 shows that at region 48, the received signal strength is greater then −85 dBm from base stations 15 and 20. However, only base station 20 is considered to service the region 48 because the difference in the received power from base stations 15 and 20 is 40 dBm which is greater than the 15 dBm limit. Thus, in Table 4, region 48 is indicated as service only by the base station 20.

TABLE 4

Regional Coverage by base stations 5, 10, 15 and 20

| Region | 5 | 10 | 15 | 20 |
|---|---|---|---|---|
| 1 | 1 | 0 | 0 | 0 |
| 2 | 1 | 0 | 0 | 0 |
| 3 | 1 | 0 | 0 | 0 |
| 4 | 1 | 0 | 0 | 0 |
| 5 | 1 | 0 | 0 | 0 |
| 6 | 0 | 1 | 0 | 0 |
| 7 | 0 | 1 | 0 | 0 |
| 8 | 0 | 1 | 0 | 0 |
| 9 | 0 | 1 | 0 | 0 |
| 10 | 0 | 1 | 0 | 0 |
| 11 | 0 | 1 | 0 | 0 |
| 12 | 0 | 1 | 0 | 0 |
| 13 | 0 | 1 | 0 | 0 |
| 14 | 0 | 1 | 0 | 0 |
| 15 | 0 | 1 | 1 | 0 |
| 16 | 1 | 0 | 1 | 0 |

TABLE 4-continued

Regional Coverage by base stations 5, 10, 15 and 20

| Region | 5 | 10 | 15 | 20 |
|---|---|---|---|---|
| 17 | 1 | 0 | 0 | 0 |
| 18 | 1 | 0 | 0 | 0 |
| 19 | 1 | 0 | 0 | 0 |
| 20 | 1 | 0 | 0 | 0 |
| 21 | 1 | 0 | 0 | 0 |
| 22 | 1 | 0 | 0 | 0 |
| 23 | 1 | 0 | 0 | 0 |
| 24 | 1 | 0 | 1 | 0 |
| 25 | 0 | 0 | 1 | 0 |
| 26 | 0 | 0 | 1 | 0 |
| 27 | 0 | 1 | 1 | 0 |
| 28 | 0 | 1 | 0 | 0 |
| 29 | 0 | 1 | 0 | 0 |
| 30 | 0 | 1 | 0 | 0 |
| 31 | 0 | 0 | 0 | 1 |
| 32 | 0 | 1 | 0 | 1 |
| 33 | 0 | 1 | 1 | 1 |
| 34 | 0 | 0 | 1 | 1 |
| 35 | 0 | 0 | 1 | 0 |
| 36 | 0 | 0 | 1 | 0 |
| 37 | 0 | 0 | 1 | 0 |
| 38 | 1 | 0 | 1 | 0 |
| 39 | 1 | 0 | 0 | 0 |
| 40 | 1 | 0 | 0 | 0 |
| 41 | 0 | 0 | 0 | 0 |
| 42 | 0 | 0 | 0 | 0 |
| 43 | 0 | 0 | 1 | 0 |
| 44 | 0 | 0 | 1 | 0 |
| 45 | 0 | 0 | 1 | 0 |
| 46 | 0 | 0 | 1 | 0 |
| 47 | 0 | 0 | 1 | 1 |
| 48 | 0 | 0 | 0 | 1 |
| 49 | 0 | 0 | 0 | 1 |
| 50 | 0 | 0 | 0 | 1 |

Hand-off between base stations can occur for a mobile unit in one of the regions 15, 16, 24, 27, 32–34, 38 and 47 as is shown in Table 4. Table 4 also shows a coverage hole at regions 41 and 42 which have no service coverage by any of the base stations 5–20.

According to one aspect of the invention, it can be determined that regions 41 and 42 in the coverage hole are substantially between the base stations 5 and 15 with regard to coverage. This determination can be made because the path losses contained in Table 2 were measured such that path losses for substantially contiguous regions are in substantially adjacent positions in the Table 1. The path losses in Table 1 were measured at the regions 130 taken along the contiguous path 140 in FIG. 2. Since region 40 is covered by base station 5 and region 43 is covered by base station 15 it can be predicted that by increasing the power of, either or both of, these base stations can reduce the coverage hole of the substantially adjacent regions 41 and 42.

The path loss entries in Table 2 need not be in a strictly contiguous order to identify the location of coverage holes between base stations. However, the measurements must be taken in a known pattern to make such a determination. Further many other system parameters including the other exemplary parameters discussed in this application have no such data collection requirement. For those parameters path losses can be measured in virtually any order including a pseudo-random or random order.

The percentage of the coverage area 100 serviced by the respective base stations as well as the service area overlap between a pair of base stations can also be determined from Table 4. The coverage area percentage can be determined by the number of regions of the coverage area that are indicated as serviced by a particular base station. For instance, the number of regions serviced by the base station 5 in Table 4 is 17. Thus, the coverage area percentage serviced by the base station 5 is 34% (17 regions/50 total regions).

In a similar manner, the service area overlap percentage between base stations can be determined. Three regions of the 17 regions covered by base station 5 are covered by other base stations yielding a coverage overlap percentage of 18% (3/17×100%). Likewise, the coverage overlap percentage between base stations 10 and 15 occur at three regions, regions 15, 27 and 33 which is 6% (3/50×100%) of the coverage area 100. These percentages are based on the fact that the regions 130, shown in FIG. 2, are of substantially similar size.

The coverage area percentage and coverage overlap indicate the effectiveness of each base station in providing service to the coverage area. For the example, the coverage area and overlap percentages are contained in the following Table 5.

TABLE 5

| base stations | regions covered | overlap regions | Coverage area (%) | Coverage overlap (%) |
|---|---|---|---|---|
| 5 | 17 | 3 | 34 | 18 |
| 10 | 16 | 3 | 32 | 19 |
| 15 | 17 | 7 | 34 | 41 |
| 20 | 8 | 4 | 16 | 50 |

III. Base Station Removal

Although Table 3 illustrates that service can be provided to the coverage area 100 using four base stations, it is desirable to further determine whether such coverage could be provided using a smaller number of base stations. Such a base station reduction would provide a corresponding reduction in system cost. A base station reduction determination can be made from the measured path losses from the four base stations 5–20, shown in Table 1, without the need to collect new path loss measurement data using a smaller number of base stations.

An exemplary method that determines whether the communication system 1 of FIG. 2 can operate with a reduction in base stations uses the process 200 of FIG. 3. More specifically, the method performs the process 200 excluding the measured path losses for a particular base station to determine whether the system 1 can service the required coverage area without that base station. This method can be performed with particular base stations identified for potential removal by the installer, based on the base station coverage information such as that listed in Table 5, or otherwise. In addition the method can be performed for each base station to test the resulting coverage with each of the base stations individually removed. The process 200 can also identify the substantially minimum transmission power settings for the remaining base stations that provides the required coverage area.

With regard to the system of FIG. 2 having the path losses of Table 1, the process 200 yields that base station 20 can be removed and that the substantially minimum transmission power settings for base stations 5, 10 and 15, are 10, 10 and 15 dBm, respectively. The received signal strengths at the regions 130 from this three base station system are contained in the following Table 6.

TABLE 6

Signal strength received from base stations 5, 10 and 15

| Region | 5 (dBm) | 10 (dBm) | 15 (dBm) |
|---|---|---|---|
| 1 | −60 | −114 | −100 |
| 2 | −32 | −109 | −95 |
| 3 | −32 | −103 | −90 |
| 4 | −60 | −97 | −86 |
| 5 | −77 | −88 | −83 |
| 6 | −88 | −77 | −83 |
| 7 | −97 | −60 | −86 |
| 8 | −103 | −32 | −90 |
| 9 | −109 | −32 | −95 |
| 10 | −114 | −60 | −100 |
| 11 | −114 | −60 | −96 |
| 12 | −109 | −32 | −90 |
| 13 | −103 | −32 | −83 |
| 14 | −97 | −60 | −76 |
| 15 | −88 | −77 | −72 |
| 16 | −77 | −88 | −72 |
| 17 | −60 | −97 | −76 |
| 18 | −32 | −103 | −83 |
| 19 | −32 | −109 | −90 |
| 20 | −60 | −114 | −96 |
| 21 | −70 | −115 | −93 |
| 22 | −60 | −110 | −86 |
| 23 | −60 | −105 | −76 |
| 24 | −70 | −98 | −65 |
| 25 | −81 | −91 | −55 |
| 26 | −91 | −81 | −55 |
| 27 | −98 | −70 | −65 |
| 28 | −105 | −60 | −76 |
| 29 | −110 | −60 | −86 |
| 30 | −115 | −70 | −93 |
| 31 | −116 | −81 | −92 |
| 32 | −112 | −77 | −83 |
| 33 | −107 | −77 | −72 |
| 34 | −101 | −81 | −55 |
| 35 | −95 | −88 | −27 |
| 36 | −88 | −95 | −27 |
| 37 | −81 | −101 | −55 |
| 38 | −77 | −107 | −72 |
| 39 | −77 | −112 | −83 |
| 40 | −81 | −116 | −92 |
| 41 | −91 | −118 | −92 |
| 42 | −88 | −114 | −83 |
| 43 | −88 | −109 | −72 |
| 44 | −91 | −105 | −55 |
| 45 | −95 | −100 | −27 |
| 46 | −100 | −95 | −27 |
| 47 | −105 | −91 | −55 |
| 48 | −109 | −88 | −72 |
| 49 | −114 | −88 | −83 |
| 50 | −118 | −91 | −92 |

TABLE 7

Regional Coverage by base stations 5, 10 and 15

| Region | 5 | 10 | 15 |
|---|---|---|---|
| 1 | 1 | 0 | 0 |
| 2 | 1 | 0 | 0 |
| 3 | 1 | 0 | 0 |
| 4 | 1 | 0 | 0 |
| 5 | 1 | 0 | 1 |
| 6 | 0 | 1 | 1 |
| 7 | 0 | 1 | 0 |
| 8 | 0 | 1 | 0 |
| 9 | 0 | 1 | 0 |
| 10 | 0 | 1 | 0 |
| 11 | 0 | 1 | 0 |
| 12 | 0 | 1 | 0 |
| 13 | 0 | 1 | 0 |
| 14 | 0 | 1 | 0 |
| 15 | 0 | 1 | 1 |
| 16 | 1 | 0 | 1 |
| 17 | 1 | 0 | 0 |
| 18 | 1 | 0 | 0 |
| 19 | 1 | 0 | 0 |
| 20 | 1 | 0 | 0 |
| 21 | 1 | 0 | 0 |
| 22 | 1 | 0 | 0 |
| 23 | 1 | 0 | 0 |
| 24 | 1 | 0 | 1 |
| 25 | 0 | 0 | 1 |
| 26 | 0 | 0 | 1 |
| 27 | 0 | 1 | 1 |
| 28 | 0 | 1 | 0 |
| 29 | 0 | 1 | 0 |
| 30 | 0 | 1 | 0 |
| 31 | 0 | 1 | 0 |
| 32 | 0 | 1 | 1 |
| 33 | 0 | 1 | 1 |
| 34 | 0 | 0 | 1 |
| 35 | 0 | 0 | 1 |
| 36 | 0 | 0 | 1 |
| 37 | 0 | 0 | 1 |
| 38 | 1 | 0 | 1 |
| 39 | 1 | 0 | 1 |
| 40 | 1 | 0 | 0 |
| 41 | 0 | 0 | 0 |
| 42 | 0 | 0 | 1 |
| 43 | 0 | 0 | 1 |
| 44 | 0 | 0 | 1 |
| 45 | 0 | 0 | 1 |
| 46 | 0 | 0 | 1 |
| 47 | 0 | 0 | 1 |
| 48 | 0 | 0 | 1 |
| 49 | 0 | 0 | 1 |
| 50 | 0 | 0 | 0 |

As shown in Table 6, only regions 41 and 50 would receive signal strengths that fail to meet the threshold of −85 dBm. Therefore, the coverage area would be an acceptable 96% (48/50×100%) with the three base stations 5, 10 and 15 transmitting at 10, 10 and 15 dBm, arespectively.

It is further possible to determine other system organization parameters for the reduced base station system from the previously measured path losses for the original system without the need to measure additional path losses. Such a parameter determination can be performed in a substantially similar manner to that previously described in section I by omitting the path loss data for the base station to be removed. Table 7 is based on received signal strengths of Table 6 and contains a correlation of the base stations that would serve each region with a hand-off hysteresis limit of 15 dBm. The format of Table 7 is substantially identical to that of Table 4.

IV. Isolation Values, Neighbor Lists and Channel Reuse

The transmission power and region coverage of Tables 6 and 7 can be used to generate isolation values in accordance with the invention. Isolation values are a measure of radio frequency isolation on a channel at a base station, or a mobile unit at a region 130, from other signals from other base stations or mobile units that would interfere if they were permitted to transmit on the same an channels. In other words, isolation values indicate channel interference by the strength of a received signal at a base station, or a mobile unit at the region 130, relative to an interfering signal strength from other base stations or mobile units that would occur if they used the same channels. Such channel interference can be up-link or down-link interference or a combination of these interferences. Down-link interference is channel interference received at regions serviced by a first base station caused from signals transmitted by other base stations. Up-link interference is interference at the base stations caused from signals transmitted by mobile units in regions of the coverage area that are not serviced by that base station.

Figure 4:
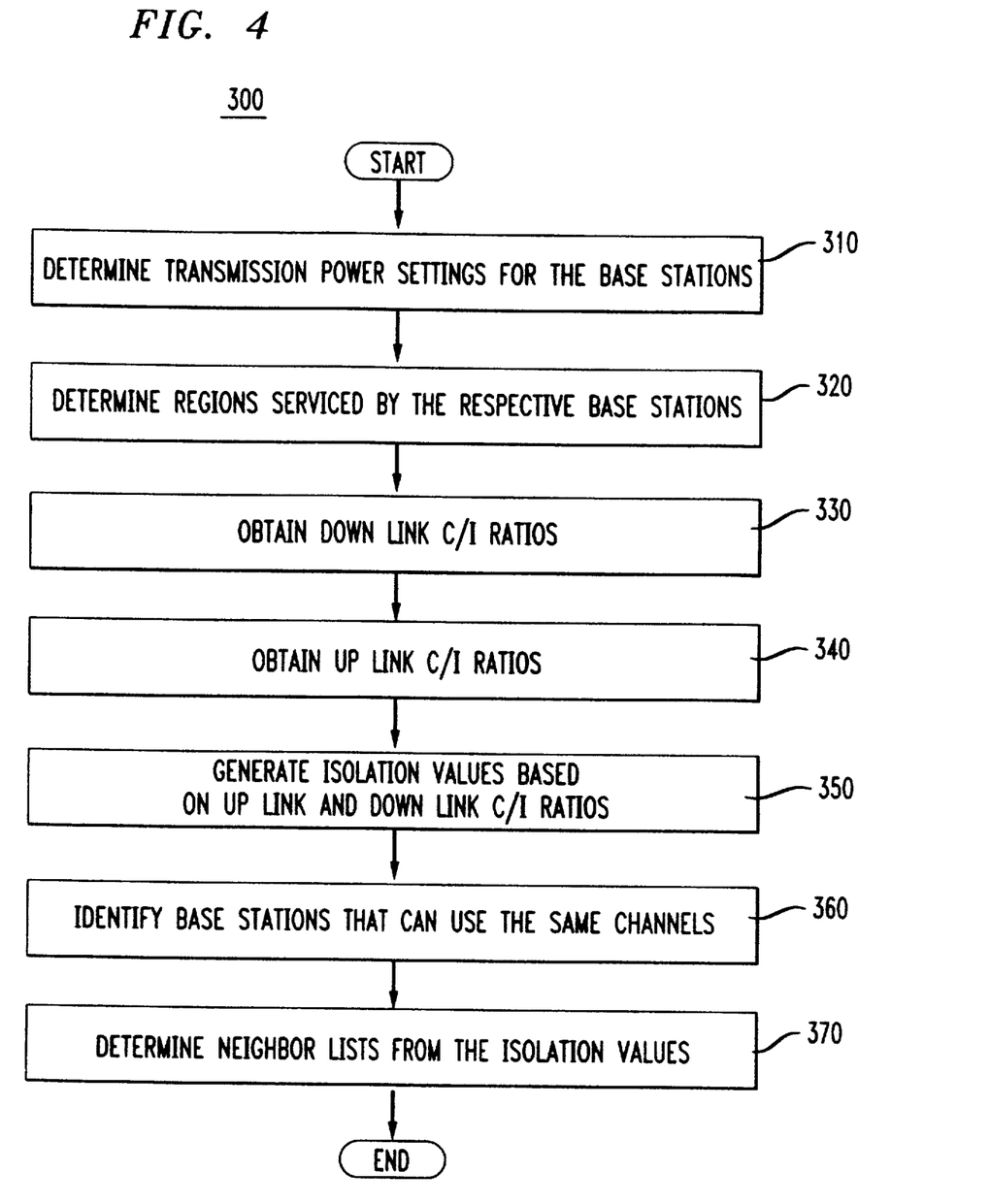
FIG. 4 illustrates a flow diagram of an exemplary process in accordance with the invention for determining frequency reuse schemes and neighbor lists based on isolation values for the system arrangement of FIG. 2.

FIG. 4 illustrates an exemplary method 300 for determining base station isolation values based on up-link and down-link isolation values. The up-link and down-ink isolation values determined according to the method 300 are further based on carrier-to-interference (C/I) ratios. A large C/I ratio indicates a signal that is substantially isolated from channel interference while a small C/I ratio indicates a signal having substantial channel interference. Thus, large C/I ratio values between conventional cellular base stations that are, for example, greater than approximately 18 dBm, indicates that such base stations can use the same channel while small C/I ratio values between base stations, such as, for example, less than approximately 1 dBm, indicate that the base stations are neighbors as is described below with regard to Table 11. It should be readily understood that carrier and interference signals for this discussion occur on the same channel or frequency.

The method 300 is described with respect to the system of FIG. 2 as modified by the removal of the base station 20 as previously described in section III. Referring to FIG. 4, the base station transmission powers and the regions serviced by the respective base stations are determined in steps 310 and 320. The transmission powers can be determined from the measured path losses in Table 1 to provide the intended coverage area as is previously described with regard to Tables 3 and 6. For the example, the substantially minimum transmission power settings for the base stations 5, 10 and 15 are 10, 10 and 15 dBm, respectively, to provide the required coverage area as is described in section III. Identification of the regions serviced by the respective base stations at these transmission settings using a hand-off hysteresis limit of 15 dBm is shown in Table 7.

After the region coverage is determined in step 320, down-link isolation values such as service area down-link C/I ratio values are determined in step 330. A service area down-link C/I ratio is a measure of interference on a down-link portion of a channel at regions serviced by a particular base station from signals transmitted on that channel by the other base stations. An exemplary method for determining a service area down-link C/I ratio value includes: 1) determining down-link C/I ratios for the individual regions 130 in a base station service area; and 2) using a particular quality measure, determining the service area down-link C/I ratio value based on these identified ratios.

An exemplary technique for determining the down-link C/I ratio for an individual region serviced by a first base station with interference from a second base station is to compute the difference in signal strengths $S_2$ from the first and second base stations at the region. For instance, Table 8 gives an interference distribution of the C/I ratios that would occur at regions in the service area of base station 5 if the base stations 10 and 15 transmitted on the same channel. Table 8 lists only those regions 130 that are serviced by base station 5 as indicated in Table 7.

TABLE 8

Down-link C/I ratios at Regions serviced by the base station 5

| Region | Int. form base station 10 (dB) | Int. form base station 15 (dB) |
|---|---|---|
| 1 | 54 | 40 |
| 2 | 77 | 63 |
| 3 | 71 | 58 |
| 4 | 37 | 26 |
| 5 | 11 | 6 |
| 16 | 11 | −5 |
| 17 | 37 | 16 |
| 18 | 71 | 51 |
| 19 | 77 | 58 |
| 20 | 54 | 36 |
| 21 | 45 | 23 |
| 22 | 50 | 26 |
| 23 | 45 | 16 |
| 24 | 28 | −5 |
| 38 | 30 | −5 |
| 39 | 35 | 6 |
| 40 | 35 | 10 |

A suitable quality measure for determining the service area down-link C/I ratio value is, for example, the fifth percentile of the interference distribution. The fifth percentile of the distribution refers to 5% of the regions in the service area that have the lowest determined C/I ratios which corresponds to approximately one region in the 17 regions serviced by base station 5 (1/17×100%≈5%). Accordingly, the service area down-link C/I ratio value for the base station 5 would be 11 and −5 dBm for interference from the base stations 10 and 15, respectively. In particular, the substantially lowest single down-link C/I ratio that would be caused by the base station 10 is 11 dBm at regions 5 or 16. Likewise, the substantially lowest single down-link C/I ratio caused by the base station 15 is −5 dBm at regions 16, 24 or 38.

The service area down-link C/I ratio values or down-link isolation values for the base stations 10 and 15 service areas can be obtained in a substantially identical manner as that previously described for the base station 5. Table 9 provides a correlation of the down-link C/I ratio values for the respective base station service areas in this example.

TABLE 9

Down-link C/I ratios for the regions serviced by the respective base stations (dB)

| Base stations | 5 | 10 | 15 |
|---|---|---|---|
| 5 | 0 | 11 | −5 |
| 10 | 11 | 0 | −5 |
| 15 | −6 | −6 | 0 |

Referring back to FIG. 4, after the service area down-link C/I ratio values are obtained in step 330, the method 300 obtains the up-link base station isolation or C/I ratio values in step 340. An up-link base station C/I interference measures the channel interference to a signal from a mobile unit in a region serviced by a first base station caused by mobile units in the regions serviced by a second base station. Such a determination can be made for each region in the first base station's service area. For this example, up-link interference for each of the 17 regions serviced by the base station 5 is determined based on the interference that would be caused by mobile units in each of the 17 regions serviced by the base station 10. A suitable method to obtain the cumulative up-link C/I ratios is substantially similar to the method used to obtain the cumulative down-link C/I ratios and is described in greater detail below with regard to FIG. 5. Table 10 lists the up-link C/I interference ratio values for each of the base stations' service areas.

TABLE 10

Up-link C/I ratios for the base stations (dB)

| Base stations | 5  | 10 | 15 |
|---------------|----|----|----|
| 5             | 0  | 12 | 0  |
| 10            | 12 | 0  | 0  |
| 15            | 0  | 0  | 0  |

After the up-link C/I ratio values are determined in step 340, the method 300 of FIG. 4 generates the base station isolation values based on the determined down-link and up-link C/I values, in step 350, using a quality measure. A suitable quality measure for generating the isolation values is, for example, to use the substantially minimum entry of the down-link and up-link C/I values listed in Tables 9 and 10 to yield the following isolation values Table 11.

TABLE 11

Isolation values for the base stations (dB)

| Base stations | 5  | 10 | 15 |
|---------------|----|----|----|
| 5             | 0  | 11 | -5 |
| 10            | 11 | 0  | -5 |
| 15            | -6 | -6 | 0  |

After the isolation values are generated in step 350, the neighbor lists and channel reuse determinations are performed in steps 360 and 370. With regard to channel reuse in step 360, if a substantially minimum isolation or C/I ratio is, for example, 10 dBm to permit two base stations to use the same channel then base stations 5 and 10 can use the same channel as their isolation value indicating the C/I ratio between them and their regions is 11 dBm. However, if the requirement were 18 dBm, then no channel reuse would be permitted in the system 1 with the base stations 5, 10 and 15. In a similar manner, if a requirement of approximately 1 dBm C/I is used in order for two base stations to use adjacent frequency channels, then the base stations 5 and 10 can use adjacent channels. With regard to determining neighbor lists in step 370, if an isolation or C/I requirement of, for example, 0 dBm is used then base stations 5 and 10 are neighbors of base station 15 for hand-off but base stations 5 and 10 are not neighbors to each other, as is seen in Table 11.

The previously described quality measures chosen to generate the C/I ratio values and the isolation values are representative and not intended to be a limitation of the present invention. It should be readily understood that other quality measures can be employed in accordance with the invention including averaging of all or a portion of the C/I values. Moreover, numerous other methods of manipulating the individual C/I ratio values of the regions can be used in determining the isolation values in accordance with the invention including the use of just up-link or down-link C/I ratio values. In addition, more intricate combinations of the resulting isolation values than is represented in Table 11 can also be used such as employing separate isolation values representing the up-link and down-link interference. It is also possible to include criteria in addition to the isolation values for allocating channels such as, for example, a bias to communicate with a local private wireless communication system that a nearby macro-cellular system.

Figure 5:
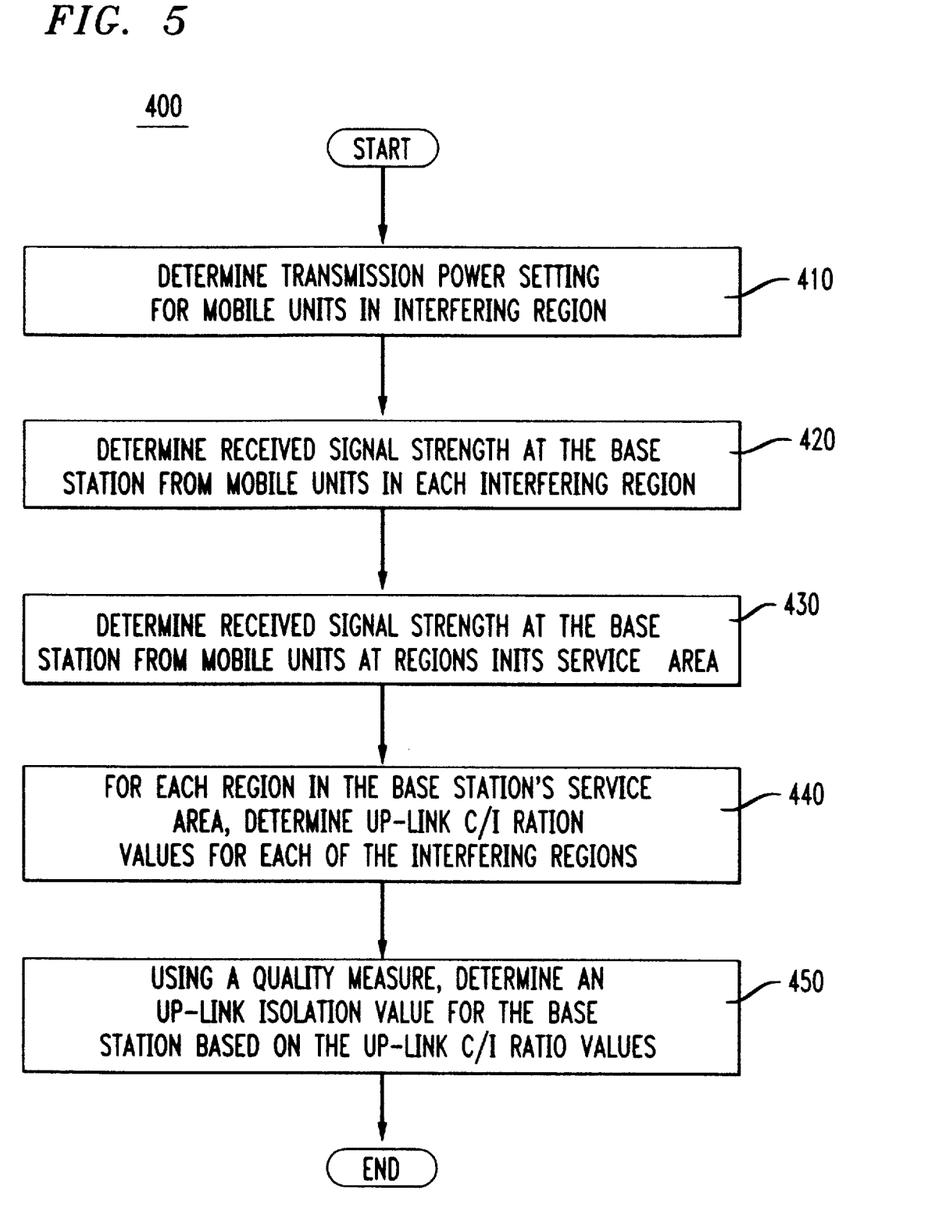
FIG. 5 illustrates a flow diagram of determining up-link isolation values for a base station in the system arrangement of FIG. 2.

An exemplary method 400 for determining an up-link C/I ratio value for a first base station is shown in FIG. 5. Referring to FIG. 5, interfering mobile unit transmission powers in the second base station's service area are determined in step 410. Transmission power can be determined for each region in the service area. It is possible for a mobile unit to transmit at a fixed power, such as 0.6 W in conventional portable cellular telephones. However, also in conventional systems, such as those conforming to the Telecommunication Industry Association Interim Standard 136 (TIA IS-136), the mobile unit transmission power can be controlled by control signals from the base station to which the mobile unit is communicating. The base station controls the mobile units power in this manner such that it receives a substantially constant signal strength as the mobile unit moves within the service area. Thus, an exemplary technique for determining the mobile unit transmission powers at the regions in the second base station's service area is to compute the transmission power required to provide the second base station with a particular signal strength such as, for example, -85 dBm based on the measured path loss between the region and the base station. However, if the path loss is substantially low, such as when the region is in close proximity to the base station, a lower limit of the mobile unit's transmission power is reached and a minimum power of, for example, -4 dBm can be used.

After the interfering mobile unit transmission powers are determined in step 410, the corresponding received signal strengths at the first base station from those transmission powers are determined in step 420. This determination is based on the measured path losses from those regions to the first base station in Table 1 in a similar manner to that used for interfering transmission powers as determined in step 410. Then, in step 430, the signal strength that would be received by the first base station from mobile units at regions within its own service area is determined. If the mobile units are power controlled, then the first station would receive a signal strength of substantially constant power, such as -85 dBm. However, if the transmission power to provide such a signal strength is less than the minimum mobile unit transmission power or if the mobile units are transmitting at a constant power, then the power reaching the base station can be determined in substantially the same manner as described above with regard to step 420. Such a determination would be based on the transmission power and the measured path loss between the regions and the first base station.

After the signal strengths are determined in steps 420 and 430, then, for each region in the first base station's service area, up-link C/I ratio values are computed based on interfering signals that would be generated by interfering mobile units from each of the regions in the second base station's service area. This computation is performed in step 440. For instance, if base station 5 that services 17 regions was the first base station and base station 10 that services 17 other regions was the second base station, then, in step 440, 17 up-link ratio values would be determined for each region in the service area of base station 5 for a total of 249 (17×17) values. Then, in step 450, a quality measure is used to determine a single up-link base station C/I ratio or up-link isolation value for the first base station's service area based on the up-link C/I ratio value computations of step 440. The method 400 can be repeated for each base station in the communication system.

In the example, if the quality measure of the fifth percentile is used then the determined base station up-link isolation values for each of the three base stations 5, 10 and 15 would be those listed in Table 10. In a substantially similar manner to the service area down-link C/I values, the particular quality measured used to generate the up-link C/I values is not critical to practicing the method of the invention. Accordingly, it should be readily understood that many other types of data manipulations can be performed to generate the up-link C/I and isolation values and that more than one value can be used to represent interference from base station service areas. In particular, unlike the down-link C/I values, the up-link C/I values need not correlate interference from mobile units based on the base station service areas in which they would be operating.

Moreover, if a system characteristic or parameter, such as the base station transmission power settings, are changed from those used to determine the isolation values, whether during system installation or operation, then the isolation values can be automatically recalculated based on the previously measured path losses and the new system characteristic or parameter settings.

Although several embodiments of the invention have been described in detail above, many modifications can be made without departing from the teaching thereof. All of such modifications are intended to be encompassed within the following claims. For instance, it is possible to use other methods and techniques than those previously described to determine system organization parameters in accordance with the invention as long as such methods and techniques are based on measured path loss-related characteristics in the system and/or corresponding resulting signal strengths.

The invention claimed is:

1. A method for determining at least one system organization parameter in a wireless communication system having a plurality of base stations arranged to serve at least one mobile unit in a particular geographic area, the method comprising:

measuring a path loss-related characteristic from a plurality of regions in said geographic area to each base station, said step of measuring being performed in substantial absence of correlation to absolute geographic information regarding where the measurements were taken;

based on said measurements, establishing a characterization of signal propagation for at least one of said regions for signals generated within said geographic area; and determining the system organization parameter based on said characterization.

2. The method of claim 1 wherein the step of determining said parameter is a verification that an existing parameter setting substantially achieves a desired performance.

3. The method of claim 1 wherein said parameter is transmission power settings for the base stations to provide service to a substantial portion of said geographic area.

4. The method of claim 1 wherein each base station provides service to a respective service area of said geographic area and wherein said parameter is a determination of an overlap of service areas.

5. The method of claim 1 wherein said parameter is a determination of whether a base station can be removed from the communication system without substantial loss in coverage of said geographic area.

6. The method of claim 1 further comprising:

for at least one base station, identifying which of said regions are to be serviced by said base station based on said measurements;

determining an isolation value for said base station based on up-link interference that would be caused by at least one interfering mobile unit in a region of the coverage area not serviced by said base station based on said measurements from the interfering mobile unit region and said identified regions; and determining said system organization parameter based on said isolation value.

7. The method of claim 6 wherein the system organization parameter is related to identifying channels useable by the respective base stations.

8. The method of claim 6 wherein the system organization parameter is a determination of neighbor base stations which is operable to receive communication hand-offs from a particular base station.

9. The method of claim 6 wherein the isolation value is based on at least one up-link carrier-to-interference ratio value.

10. The method of claim 1 further comprising:

for at least one base station, identifying which of said regions are to be serviced by said base station based on said measurements;

determining a first isolation value for at least one region of said identified regions based on down-link interference that would be caused by another base station in said system based on said measurements from said other base station to said region of said identified regions; and determining said system organization parameter based on said first isolation value.

11. The method of claim 10 wherein said parameter is related to identifying channels useable by the respective base stations.

12. The method of claim 10 wherein said parameter is a determination of neighbor base stations which is operable to receive communication hand-offs from a particular base station.

13. The method of claim 10 wherein the first isolation value is based on at least one down-link carrier-to-interference ratio value.

14. The method of claim 10 further comprising:

determining a second isolation value for said base station based on up-link interference that would be caused by at least one interfering mobile unit in a region serviced by said other base station based on said measurements from the interfering mobile unit region and said identified regions to said based station, wherein said parameter is determined based on said first and second isolation values.

15. The method of claim 1 wherein said step of establishing a characterization of signal propagation establishes the characterization that correlates said measurements for substantially contiguous regions in said geographic area;

identifying base stations that provide service to regions within close proximity to regions in coverage holes;

determining if an increase in transmission power of the identified base stations would provide service to at least a portion of said regions in coverage holes; and determining a system organization parameter of transmission power for said identified base stations based on said transmission power determination.

16. The method of claim 1 wherein the step of measuring the path loss-related characteristic comprises:

transmitting a test signal with a known signal power using a mobile test unit from said regions;

detecting signal strength of the received test signal at each base station; and determining path loss values from the detected signal strength and said known signal power.

17. A method for determining at least one system organization parameter in a wireless communication system having a plurality of base stations arranged to serve at least one mobile unit in a particular geographic area, the method comprising:

measuring a path loss-related characteristic from a plurality of regions in said geographic area to each base station wherein the step of measuring the path loss-related characteristic includes, transmitting a test signal with a known signal power using a mobile test unit from each of said regions, detecting signal strength of the received test signal from each region at each base station, and determining path loss values from the detected signal strength and said known signal power based on said measurements, establishing a characterization of signal propagation for at least one of said regions for signals generated within said geographic area; and determining the system organization parameter based on said characterization.

18. The method of claim 17 wherein the mobile test unit is moved to different regions and each of the base stations synchronously detects said signal strength from the mobile test unit at said different regions.

19. A method of communicating between (A) at least one mobile unit and (B) a wireless communication system having a plurality of base stations that service a geographic area, the method comprising:

establishing communication over at least one channel between the mobile unit and a base station of said system using at least one system organization parameter, wherein the parameter is determined according to a method comprising:

measuring a path loss-related characteristic from a plurality of regions in said geographic area to each base station, wherein the step of measuring said path loss-related characteristic is performed in substantial absence of correlation to absolute geographic information regarding where the measurements were taken;

based on said measurements, establishing a characterization of signal propagation for at least one of said regions for signals generated within said geographic area; and determining said system organization parameter based on said characterization.

20. The method of claim 19 wherein said step of establishing a characterization of signal propagation establishes the characterization that correlates said measurements for substantially contiguous regions in said geographic area;

identifying base stations that provide service to regions within close proximity to regions in coverage holes;

determining if an increase in transmission power of the identified base stations would provide service to at least a portion of said regions in coverage holes; and determining a system organization parameter of transmission power for said identified base stations based on said transmission power determination.

21. The method of claim 19 wherein the step of measuring the path loss-related characteristic comprises:

transmitting a test signal at a known signal power using a mobile test unit from said regions;

detecting signal strength of the received test signal at each base station; and determining path loss values from the detected signal strength and said known signal power.

22. The method of claim 21 wherein the mobile test unit is moved to different regions and each of the base stations synchronously detects said signal strength from the mobile test unit at said different regions.

23. The method of claim 19 wherein the step of determining said parameter is a verification that an existing system organization parameter setting substantially achieves a desired performance.

24. The method of claim 19 wherein said parameter is transmission power required by the base stations to provide coverage to a substantial portion of said geographic area.

25. The method of claim 19 wherein each base station provides service to a respective service area of said geographic area and wherein said parameter is a determination of an overlap of service areas.

26. The method of claim 19 further comprising:

for at least one base station, identifying which of said regions are to be serviced by said base station based on said measurements;

determining an isolation value for said base station based on up-link interference that would be caused by at least one interfering mobile unit in a region of the coverage area not serviced by said base station based on said measurements from the interfering mobile unit region and said identified regions; and determining said system organization parameter based on said isolation value.

27. The method of claim 26 wherein said parameter is related to identifying channels useable by the base stations.

28. The method of claim 26 wherein said parameter is a determination of at least one neighbor base station which is operable to receive communication hand-offs from a particular base station.

29. The method of claim 26 wherein the isolation value is based on at least one up-link carrier-to-interference ratio value.

30. The method of claim 19 further comprising:

for at least one base station, identifying which of said regions are to be serviced by said base station based on said measurements;

determining a first isolation value for at least one region of said identified regions based on down-link interference that would be caused by another base station in said system based on said measurements from said other base station to said region of said identified regions; and determining said system organization parameter based on said first isolation value.

31. The method of claim 30 wherein said parameter is related to identifying channels useable by the base stations.

32. The method of claim 30 wherein said parameter is a determination of at least one neighbor base station which is operable to receive communication hand-offs from a particular base station.

33. The method of claim 30 wherein the first isolation value is based on at least one down-link carrier-to-interference ratio value.

34. A method of communicating between (A) at least one mobile unit and (B) a wireless communication system having a plurality of base stations that service a geographic area, the method comprising:

establishing a communication channel between the mobile unit and one of said base stations, the particular channel being selected based on a channel allocation rule determined according to a method comprising:

measuring a path loss-related characteristic from a plurality of regions in said geographic area to said base station and at least one other base station, wherein the step of measuring said path loss-related characteristic is performed in substantial absence of correlation to absolute geographic information regarding where the measurements were taken, identifying those regions that are to be serviced by said base station and at least one other base station based on said measurements for those regions;

determining an isolation value indicative of a carrier-to-interference ratio for a particular channel for said base station, wherein said isolation value determination is based on said measurements from the identified regions; and creating the channel allocation rule based on said isolation value.

35. The method of claim 34 further comprising:

for at least one base station, identifying which of said regions are to be serviced by said base station based on said measurements;

determining an isolation value for said base station based on up-link interference that would be caused by at least one interfering mobile unit in a region of the coverage area not serviced by said base station based on said measurements from the interfering mobile unit region and said identified regions; and determining said system organization parameter based on said isolation value.

36. The method of claim 35 wherein the isolation value is based on at least one up-link carrier-to-interference ratio value.

37. The method of claim 34 further comprising:

for at least one base station, identifying which of said regions are to be serviced by said base station based on said measurements;

determining a first isolation value for at least one region of said identified regions based on down-link interference that would be caused by another base station in said system based on said measurements from said other base station to said region of said identified regions; and determining said system organization parameter based on said first isolation value.

38. The method of claim 37 wherein the first isolation value is based on at least one down-link carrier-to-interference ratio value.

39. The method of claim 37 further comprising:

determining a second isolation value for said base station based on up-link interference that would be caused by at least one interfering mobile unit in a region serviced by said other base station based on said measurements from the interfering mobile unit region and said identified regions to said based station, wherein said parameter is determined based on said first and second isolation values.

40. A method for establishing initial system organization in a wireless communication system having a plurality of base stations arranged to serve at least one mobile unit in particular geographic area, the method comprising:

locating a first plurality of base stations at positions throughout the geographic area;

for each of a plurality of regions in the geographic area measuring a path loss related characteristic from that region to each of said first plurality of base stations;

compiling the measurements in a memory;

analyzing the compiled measurements to define at least three start up parameters selected from the group of start up parameters including the number of base stations to be designated; the location of designated system base stations; the transmission power settings of designated base stations; base-station hand-off protocols; designated base station channel assignments; isolation values and channel re-use designations.

* * * * *